United States Patent
Dorenbosch

(10) Patent No.: US 6,901,259 B2
(45) Date of Patent: May 31, 2005

(54) COMMUNICATION SYSTEM THAT PROVIDES ADJUSTABLE COMMUNICATION SERVICE AVAILABILITY TO SUBSCRIBERS

(75) Inventor: Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/784,801

(22) Filed: Feb. 15, 2001

(65) Prior Publication Data

US 2002/0115442 A1 Aug. 22, 2002

(51) Int. Cl.[7] .................................................. H04Q 7/00
(52) U.S. Cl. ....................................................... 455/453
(58) Field of Search ................................ 455/453, 414, 455/445, 452

(56) References Cited

U.S. PATENT DOCUMENTS

| | | | | |
|---|---|---|---|---|
| 6,282,429 B1 | * | 8/2001 | Baiyor et al. | 455/512 |
| 6,324,399 B1 | * | 11/2001 | Salmivalli | 455/433 |
| 6,327,472 B1 | * | 12/2001 | Westroos et al. | 455/436 |
| 6,330,451 B1 | * | 12/2001 | Sen et al. | 370/229 |
| 6,366,780 B1 | * | 4/2002 | Obhan | 370/329 |

* cited by examiner

*Primary Examiner*—Nick Corsaro
(74) *Attorney, Agent, or Firm*—Hisashi D. Watanabe

(57) ABSTRACT

A communication system that provides communication services to a plurality of communication devices over one or more wireless channels. The communication system includes an operator interface that allows for interactive modification of system parameters to provide adjustable service availability.

16 Claims, 4 Drawing Sheets

COMMUNICATION SYSTEM THAT PROVIDES ADJUSTABLE COMMUNICATION SERVICE AVAILABILITY TO SUBSCRIBERS

FIELD OF THE INVENTION

In general, the present invention relates to the field of communication systems, and more particularly, to a communication system that provides adjustable communication services.

BACKGROUND OF THE INVENTION

In today's point-to-point communications, wireless communication systems provide many advantages over conventional systems. The communication systems provide efficient allocation of limited communication resources, for example, radio frequency (RF) channels, to a large number of subscribers that use the communication devices, such as cell phones and mobile/portable radios, to access various communication services.

In a wireless communication system, a plurality of communication devices communicate voice and data messages via one or more base stations that provide the air interface and radio link to the communication devices. A communication resource controller is responsible for allocation of the RF channels and other system resources. Generally, the resource controller controls the type of information transmitted to the communication devices and the way it is encoded. For example, control messages are communicated over control channels, and voice and data messages are communicated over voice or data (also known as traffic) channels. The resource controller, upon reception of an inbound channel request from one of the communication devices or when the communication device is being called, allocates the available resources to the communication device.

In some communication systems, the availability of system resources impacts access latency to the communication services. That is, when the communication resources are fully utilized, the subsequent communication devices that request service are placed in queue until the system resources become available again Normally when a specified maximum allowed queue size is reached, further resource requests are ignored or denied.

Service availability corresponds to the probability of communication service (e.g., voice or data service) being available to service subscribers. For example, the communication services may require placing calls or connecting to a private or public network, such as the Internet. The precise definitions of availability are often documented in a contract between an equipment vendor and a customer service provider. The definitions usually specify the parameters that impact the availability of the system. For example, a web connection within 45 seconds can be specified to satisfy a system availability definition. Alternatively, producing ringing tones for a placed call within 30 seconds could be used as another definition for system availability.

Availability is often measured in "nines". To obtain this measure the availability is first expressed as a percentage. An availability of 99.99% is four-nines availability. Some system operators try to achieve what is called a "5-nines" availability that corresponds to providing uninterrupted service at least 99.999% of the time. Because of the need for additional resources, such availability may come at a price to those subscribers that do not require such a high availability. It is known to trade off service availability against other system parameters, such as maximum number of supported users, latency, flexibility, efficiency, etc.

Conventionally, availability is specified when a system is purchased. In more advanced systems a purchased system can be configured at startup to provide a certain availability. Moreover, technology exists to calculate how availability depends on system configuration and parameters. Known systems offer subscribers a range of system configurations that are designed to support a defined availability for a specified price or subscription fee, where each system is configured and customized at the beginning of service. However, if a subscriber later realizes that a different service availability is needed, a new configuration and customization process must be initiated. As such, the known processes for providing customized communication services are inflexible.

Accordingly, there exists a need to provide flexible and adjustable communication services to subscribers, without having to re-customize, every time subscriber service availability needs changes, which is a cumbersome and costly process Preferably the availability can be varied while the system is operating.

DETAILED DESCRIPTION OF THE PREFERRED EMBODIMENT

According to the present invention, a communication system provides adjustable communication services availability to a plurality of communication devices over one or more radio frequency channels. The communication system includes a resource controller that controls communication resources provided by various system components, for example, one or more base stations. That is, the resource controller can control at least one communication resource used to provide the communication services. An operator interface interfaces with the resource controller to interactively modify communication services availability to the plurality of the communication devices, thereby providing adjustable communication services availability. In an exemplary embodiment, the operator interface may be a computer that allows for adjusting system parameters while the communication system is operating, without the need for shutting down and re-customizing or reconfiguring the system.

In accordance with some of the more detailed features of the present invention, the service availability is interactively modified by changing one or a combination of system parameters. The system parameters include: the number of communication devices that receive the communication services, the bit-error rate over RF channels, and a coding algorithm used to communicate information with the plurality of communication devices. The system parameters can be changed based on a pre-programmed algorithm. Alternatively, one or more system parameters can be monitored in order to interactively modify communication service availability. The monitored parameters can include the number of registered subscriber during a given period of time, load on RF channels, load on system components that provide the communication resources, traffic mix, or coding algorithms that are used for providing voice, video and data communication services. The resource controller can monitor the load of one or more system components over a period of time. In this way, the resource controller can derive load distributions for the communication resources. The monitored, or estimated average out-of-service time for the system components can also be taken into account when determining the best way to provide a desired availability.

Figure 1:
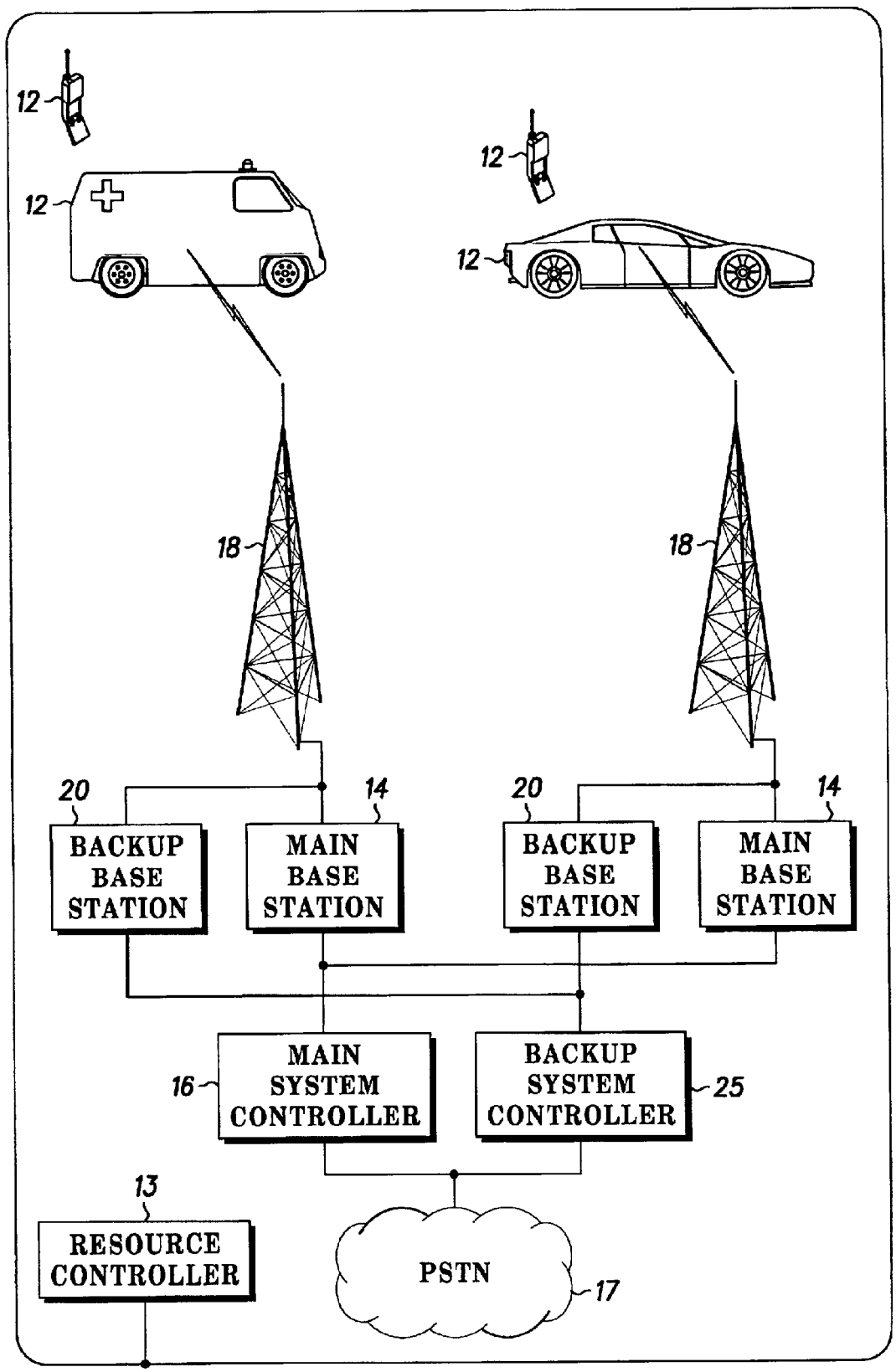
FIG. 1 illustrates a communication system suitable for using an embodiment in accordance with the present invention.

Referring to FIG. 1, a block diagram of a communication system 10 is shown. The communication system 10 of the exemplary embodiment is a trunked communication system offered by Motorola Inc., the assignee of the present invention. The system 10 includes various system components, such as base stations, systems controllers, etc. The detailed specifics of the operation of such systems are well known. Therefore, the present invention is described only to extent necessary for enabling one skilled in the art to make and use the invention. Moreover, the present invention is equally applicable to various other wireless system embodiments, such as land mobile systems, cellular systems (e.g., GSM, IS-136, IS-95, iDEN) personal communication systems (e.g., Bluetooth, GPRS, UMTS, etc.) and paging systems (e.g., Flex and Reflex).

The system 10 provides communication services to a plurality of communication devices 12. Each communication devices 12 can operate as a single unit or it can operate in a group within an assigned fleet. As shown, some of the communication devices 12 belong to an emergency fleet, such as those associated with ambulances, etc., while others belong to non-emergency fleets.

As described later in detail, a resource controller 13 is responsible for the allocation of resources within the communication system 10, including the allocation of the RF links over which voice, data, and control information are communicated. The resource controller 13 controls various system components that provide the communication resources. Such components include a main base station 14, a main system controller 16, a backup base station 20 and a backup system controller 25. The base stations 14 and 20 provide the RF links, via antennas 18, to all of the communication devices 12. In a known and representative manner, the system controllers 16 and 25 communicate control messages on a control channel and voice and data messages on a plurality of traffic channels. Based on control information received from the system controllers 16 and 25, the communication devices 18 use allocated traffic channels to carry voice and data communication. The system controllers 16 and 25 are also responsible for interfacing with other communication networks, such as a public switching telephone network (PSTN) 17.

When the main base station 14 malfunctions or otherwise additional service capacity is needed, the backup base station 20 serves the communication devices 12. Similarly, the backup system controller 26 provides communication service to the communication devices 12 in the event the main system controller 14 is out of service or additional capacity is needed. The backup system controller 26 can have a specified capacity, for example, smaller than that of the main system controller 14. Switches switch a main system component to a backup system component and vice versa. In this way, the system components can be used to interactively adjust service availability to the communication devices 12.

Figure 2:
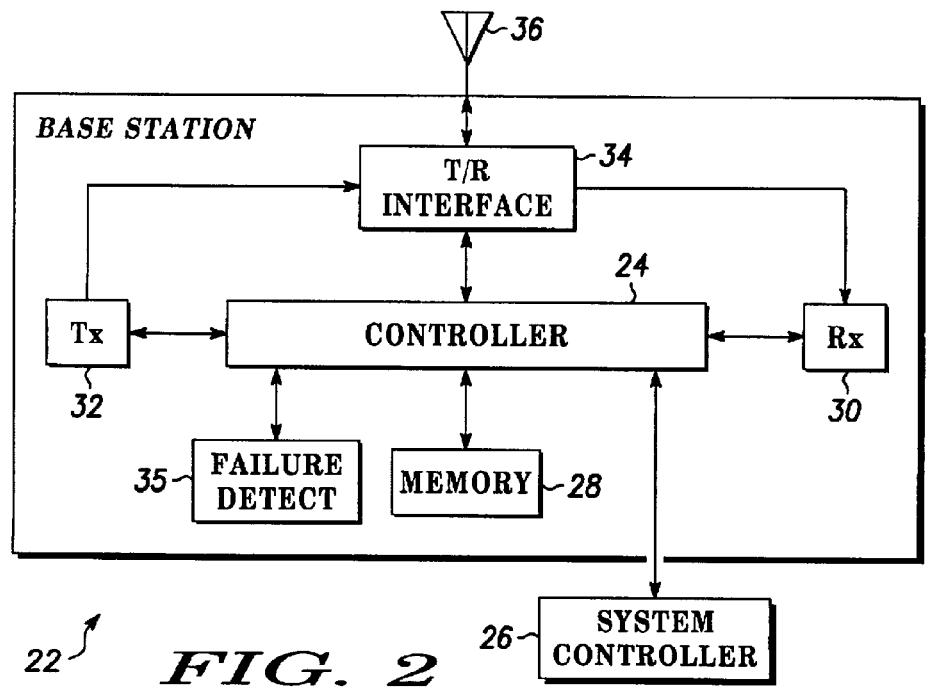
FIG. 2 illustrates a block diagram of a base station in the communication system of FIG. 1.

Referring to FIG. 2, a general block diagram of a base station 22 is shown. The diagram is shown generally to encompass both the main or the backup base stations 14 and 20 of FIG. 1, even though under the present invention, the main and backup base stations 16 and 20 can have different communication capacities, for example, in terms of number of supported RF channels, communication speed or required AC supply power, etc. The base station 22 operates under the control of a base station controller 24, which receives and responds to instructions or commands received from a system controller 26. For providing operational control, the controller 24 executes a suitably developed application program that is stored in a memory 28. Based on the received instructions from the system controller 26, the controller 24 operates one or more transceivers supporting inbound and outbound traffic and control channels.

In a transmit mode, controller 24 applies modulation and amplification for preparing a communication signal to be transmitted by a transmitter 32 over the outbound channels. The modulated amplified communication signal is then radiated via an antenna 36 through a TX/RX interface 34 that facilitates duplex communication under the control of the controller 24. In a receive mode, the base station receives electromagnetic radiation from the communication devices 12 at the antenna 36 over inbound communication channels. The received electromagnetic radiation or energy is demodulated at a receiver 30 which is coupled to the TR/RX interface 34.

The base station 22 also includes failure detection circuitry 35 that upon detection of a failure transmits a failure signal to the controller 24. The controller 24 in response to the failure signal, transmits an appropriate message to the system controller 26, informing it of a system failure. As described in connection with FIG. 1, once a failure condition is detected, the main system controller 16 switches from the main base station 14 to the backup base station 20. Of course, the system controller 26 can detect a fault condition on its own, for example, if a response to a polling request transmitted by the system controller is not received from the base station 22 within a predefined period of time.

Figure 3:
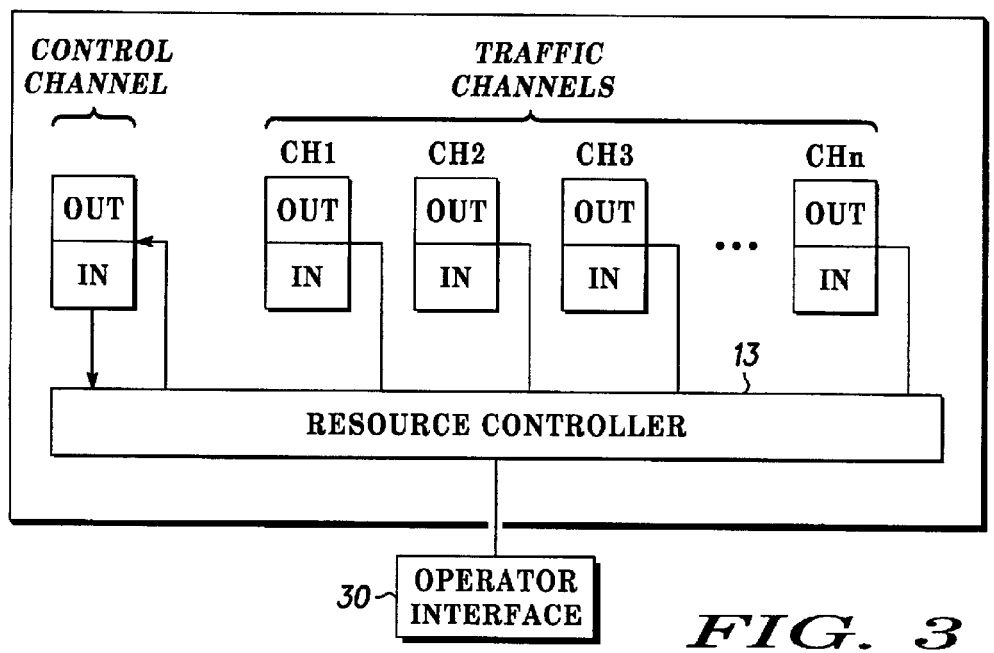
FIG. 3 illustrates a block diagram of a resource controller in the communication system of FIG. 1.

Referring to FIG. 3, a logical block diagram shows the resource controller 13 controlling various resources, such as control and traffic channels used to provide adjustable communication services in accordance with the present invention. The resource controller 13 controls a plurality of communication resources, inbound and outbound communication links to one or more base stations. The communication protocol on the control channel is predefined based on the requirement of the communication system 10. Based on availability, the resource controller 13 also allocates traffic channels that provide voice/data information and services. In accordance with the present invention, an operator interface 30 interfaces with the resource controller 13 to interactively modify communication service availability to the plurality of the communication devices 12, thereby providing adjustable communication services availability. The operator interface 30 can be located at an operation and maintenance center that is charged with providing support and maintenance to the communications system. The operator interface 30 can be a computer that is coupled to the resource controller 13 in order to allow for interactive modification of the communication service availability. The operating interface 30 is programmed to provide various screens and user interfaces that allow various system parameters to be modified. The system parameters adjusted by the operator interface 30 include: the number of users, users within a cell, bit rate, and coding algorithm used for voice and data communication. In other words, the operator interface 30 acts as an adjustment knob for adjusting the service availability to the communication devices 12. For example, an operator that requires high service availability for its subscribers could obtain an increased level of service availability by interactive adjustments that the operator interface provides. Using this invention the resource controller then varies parameters in the system to provide the higher service availability. In this way, the operator interface 30 can be used to increase or decrease the service availability to the communication devices that are subscribed to various classes of services.

Figure 4:
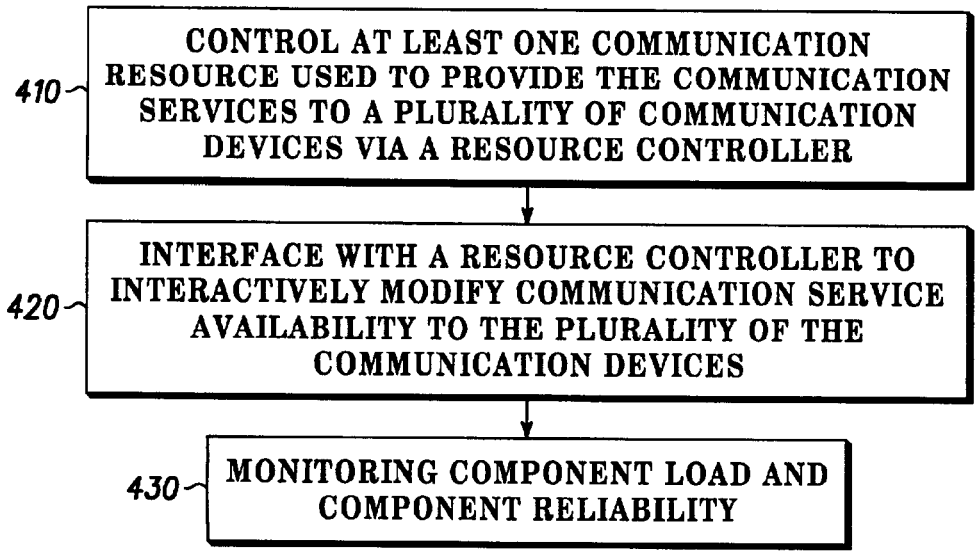
FIG. 4 illustrates a flowchart of a method for providing communication services in accordance with the present invention.

Referring to FIG. 4, a flow chart of a method for providing communication services to a plurality of communication devices in accordance with the present invention is shown. The method includes controlling at least one communication resource used to provide the communication services to the plurality of communication devices 12 via the resource controller 13, block 410. The communication service availability to the plurality of the communication devices is interactively modified by interfacing with the resource controller 13 via the operator interface 30, block 420. Optionally, the method of the invention can also include the step of monitoring component load and component reliability, block 430.

Operationally, the main system controller 16 uses an outbound control channel for transmission of outbound signaling words (OSW) in accordance with a defined communication protocol. The system controller 16 also receives inbound signaling words (ISW) on an inbound control channel. Bit pattern of the ISWs and the OSWs are defined by the communication protocol requirements so as to communicate the control information, which enables orderly communication with the communication devices 12. When the system 10 is in idle state, i.e., no communication is in progress, the communication devices 12 monitor the outbound control channel for background data OSWs that are periodically transmitted. The system controller 26 also monitors the availability of other traffic channels. The background OSWs contains such information as system identification and channel identification, which, among other things, inform the communication devices 12 of their fleets or cells and channel assignments to that fleet or cell.

In order to register with the system 10, a communication unit (CU) 12 typically uses a number of ISWs to request access to the system resources. The system 10 then uses a number of OSWs to either grant or deny such access. Since the system 10 can not support an infinite number of CUs, it maintains a parameter that determines the maximum allowed number of registered communication units 12. When that maximum number is reached, no further communication unit 12 is allowed to register. In this way, the communication system 10 of the present invention is given the ability to control the number of registered communication units.

When a call (voice, video, or data) is initiated, communication devices 12 enter into transmit mode to transmit a channel access ISW. The communication devices 12 transmit a first channel access ISW, on the inbound control channel. The channel access ISW comprises information, such as fleet ID, unit ID, cell ID, etc. Transmission of the first channel access ISW indicates that a communication device 12 is attempting to access service. If the system controller 26 receives the channel access request ISW, it searches all the available traffic channels and upon availability, allocates a traffic channel to the communication device 12. If an available channel is found, a channel grant OSW is transmitted to the communication device 12, and if an available channel is not found a channel busy OSW is transmitted. The channel grant OSW indicates the channel number of the allocated traffic channel to all of the communication devices 12 operating within the communication system 10. Upon reception of a valid OSW (i.e., channel grant or busy), the initiated call is processed.

When an operator chooses a higher service availability, in one exemplary embodiment of the invention, the communication system can reduce the number of users that is allowed to register with the system 10. As a result, some of the users may have to register with another system. Also, the minimum bit rate can be lowered on some of the channels in order to increase service availability. Such bit rate lowering, however, may increase data distortion. For example, in video applications, downloaded video data may include a higher level of distorted pixel data. Alternatively, a voice or video coder with lower bit rate may be utilized to decrease the load on the channels and hence increase service availability. The increase in service availability would, however, be at the expense of degraded voice or video quality. Of course, more than one parameter can be varied. In accordance with one embodiment of the present invention, an operator is given a choice as to which parameters should be adjusted in order to interactively modify the service availability.

The amount by which the system parameters can be varied may be preprogrammed based on an algorithm, for example, when the system is delivered. Alternatively, the resource controller 13 can adjust the availability of communication resources by monitoring certain system parameters, while the system is operating. The resource controller 13 can be given access to a set of system parameters that are observed or monitored. These observations can include: the number of registered users, load on the traffic channels, load on the system components, traffic mix, voice coder and video coders used, etc. For example, the traffic mix may be the mix of data, voice or video that has been used in the system. These parameters can be monitored for a specified period of time, for example, as a function of the time of the day.

Figure 5:
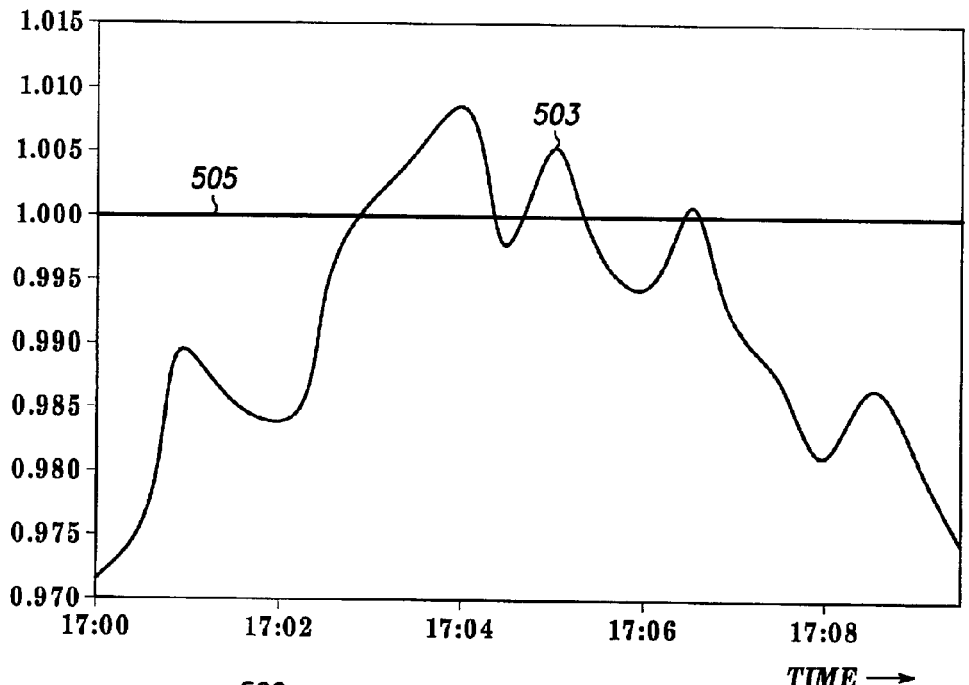
FIG. 5 is an exemplary chart illustrating system load as a function of time.
Figure 6:
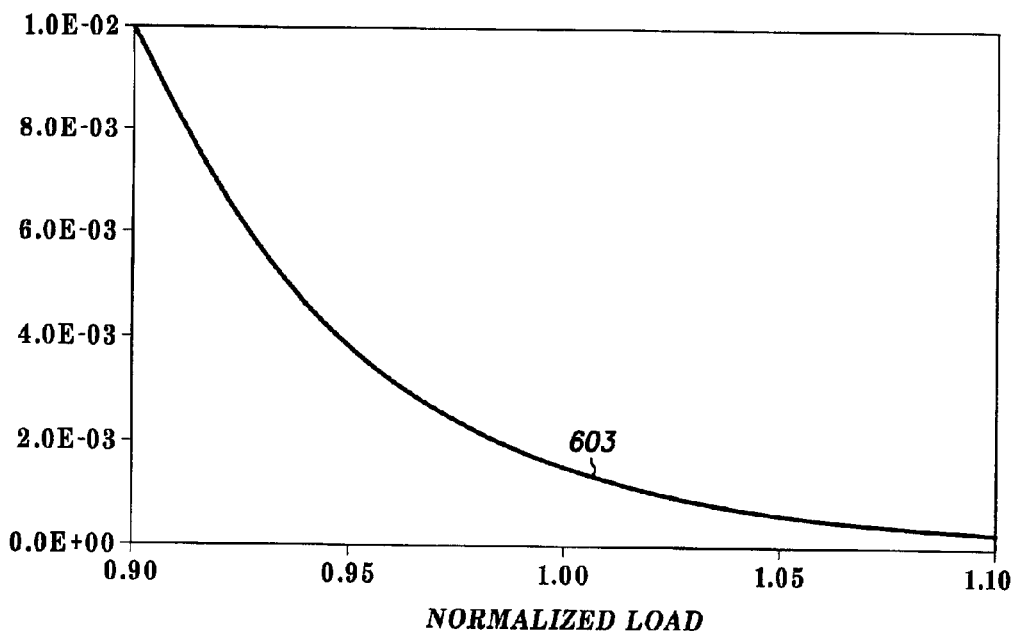
FIG. 6 is an exemplary chart illustrating the probability of service availability as a function of system load.

Referring to FIG. 5, a chart 500 shows an example of the measured load 503 on a system over a period of a few minutes of a busy hour. Note, while depicted for a brief period of time, it is understood that the load is measured, preferably continually but in any event a sufficient portion of time to realize statistically useful information. As shown, the measured load is normalized to a load unit of one (1). It can be seen that from time to time the load exceeds the unity level 505. In accordance with the present invention, during those times that the load exceeds the threshold or unity level, the load is shared between the main and back-up system components. From the system load data as depicted in FIG. 5 and continuously measured, the resource controller 13 can derive an accurate system load distribution for each component in real time. From this system load information or distribution a graph such as FIG. 6 may be derived. FIG. 6 depicts a graph 600 having a curve 603 that shows the fraction of time (vertical axis) that the load (horizontal axis) on the system unit of the main and back-up system controller is above a normalized value of one. Because the resource controller 13 is aware of the system topology, it also knows that if a user is not serviced by the main or back-up system controllers 16 and 25, the user loses service. The resource controller 13 also monitors the fraction of time that each system component is down. It may determine, for example, that the chance one of the main or back-up system controller 16 or 25 is down is 0.25 percent. This is later referred to as the downtime fraction. Moreover, the resource controller 13 knows that the number of users that are allowed to register or allowed to attach with the system, the minimum allowed on the channels, and voice coder or video coder used for the multimedia communications. By adjusting these parameters, the system 10 of the present invention can provide adjustable service availability to the communication devices 12 based on an operator request via the operator interface 30. In essence the graph of FIG. 6 will move horizontally as these parameters and hence load varies up or down.

In one exemplary setting, it is assumed that an operator uses the operator interface 30 to set the service availability to 5-nines (99.999%). To simplify this example, it is also assumed that system components, like the main and backup base stations 14 and 20, are completely reliable and have ample spare capacity, with the only risk of failure being associated with the main or backup system controllers 16 and 25. In this example, the probability that main and backup system controllers 16 and 25 being simultaneously down is also ignored. Under this arrangement, if a failure occurs while the load on the system is less or equal to 1 unit, no user would be affected, because the load can be supported by either the main or the backup system controller. However, if the failure happens when the load is greater than 1 unit, a fraction of the users would lose service because the system would not be available. Thus it should be clear that the system will not be available whenever the load exceeds 1 and a system controller is not available. Statistically this unavailability probability can be found or determined with the aid of FIG. 6. From the information in FIG. 6, the system can calculate the current availability level or probability as 1—unavailability probability. The unavailability probability is 0.0025 (downtime fraction)*0.0015 (probability of load >1)=0.00000375. Subtracting from 1 and stating as a percent, we see that the current availability is 99.9995%, or better than the 5 nines specified or desired by the operator.

To provide 5 nines availability, the system can support a larger load by, for example, allowing more users. To compute the number of users that can be allowed in this exemplary setting the resource controller computes an unavailability probability of 1−0.99999=0.00001. From above we know that dividing this unavailability probability (0.00001) by the downtime fraction (0.0025) will yield the probability of the load >1 (0.004). With this system we can adjust, in this case upwards, the load such that the probability of load >1 moves from 0.0015 (current measurement) up to 0.004 (targeted probability of load >1 for 5 nines availability). From the FIG. 6 curve, the controller 13 can determine that with a probability of 0.004 (fraction of time) the present or measured load will exceed a normalized load value of 0.95 units. From this discussion it is understood that the system will available unless the load exceeds unity or 1. Hence the resource controller can reach the requested or desired availability by increasing the maximum allowed number of users so that the normalized load is unity or 1. For example, assuming the current maximum number of users is 200,000, the system can support 200,000/0.95or 210,500 users.

In a second example, it is assumed that the operator sets or desires an availability of 6 nines. In this case, the resource controller 13 computes the allowed or targeted probability of the load >1 unit as equal to 0.000001 (1−0.999999, 6-nines) divided by 0.0025=0.0004 for a targeted probability of exceeding 1 units of load. From the data in FIG. 6, the controller determines that the system presently exceeds a load of 1.07 units with a probability of 0.0004. Again recognizing that the load must be reduced so as to have the normalized load=to or <than 1, except for 0.0004 or $4/10,000$ths of the time, the resource controller 13 will limit the number of users or shed users until 200,000/1.07=186,900 users or less are served. Thus, some users would have to be removed from the system in order to satisfy the desired service availability.

As one additional example, the system can monitor the load for at least one cell or geographic coverage area within the system, and generate information such as is shown in FIG. 5 and discussed above with reference to the system controller. Analogously the system can derive a cumulative load distribution for this cell, which would look similar to FIG. 6. However in this case since a cell does not have a 'backup' such as the system controller had the load on the cell must be rigorously kept below 1 unit for a cell to be available at all. Assume now, after having gathered the information that allows us to construct the relevant graphs analogous to FIGS. 5 and 6 we determine that the load on a given cell only exceeds 0.9 units with a probability of 0.00001 (5-nines). In this case we can increase the load from 0.9 units to 1 unit or increase the load on the cell by 1/9 and still have the cell be available 99.999% of the time.

In general, a system will control the number of communication devices that are allowed into a certain cell. The maximum number of device allowed in the cell is a system parameter. Many systems have known ways to distribute devices between neighboring cells to control the load on each of the neighboring cells through cell access control. So in a system where the operator specifies an availability of 5-nines, the resource controller may adjust the system parameter for our example cell upward by a factor 1.11. If the maximum number of devices in the cell is presently set to 200, this number may be increased by the resource controller to 222.

Those skilled in the art will understand that total system availability is a well understood combination of the system availability of each of its components. In particular, different cells enter into the overall system availability with different weights that depend in a known way on such factors as the number of calls made from each cell. These weights are taken into consideration by the resource controller when adjusting parameters of individual components. The resource controller preferably derives the weights from actually monitored quantities, such as the number of calls attempted from each cell.

As described before, the resource controller 13 can also measures the fraction of the time that each voice or video coder rate is used. The resource controller 13 can instruct system components to use lower coder rates and thereby reduce the data load on the system controllers 16 and 25. Alternatively the resource controller 13 can instruct the system components to reduce the data load only while system load on the system controllers is high (near or above 1 unit). Consequently, average voice quality may go down slightly. The resource controller 13 can also instruct the system components to use the lower coder rates only while only one of the main and backup system controllers 16, 25 are down. This requires that the resource controller 13 can rapidly discover that a component is down, and can communicate rapidly with the other system components.

From the above discussion it is clear that availability can be managed in more than one way. The resource controller 13 can make a choice of which way(s) are to be used. This choice can be based on preprogrammed algorithms that may or may not take into account other real-time observations of the system. The resource controller may also leave (part of) the choice to the operator.

In a system many of the components will impact the availability. For example, the channels at a cell may become saturated. If this happens while calls are in progress or being set up, availability suffers. The resource controller 13 can measure the fraction of the data that is sent at each channel bit rate. To change availability, the resource controller 13 can control the load on the channels by manipulating the bit rates. To increase availability, for example, the controller can instruct the base station of the cell to use higher bit rates. This increases channel throughput and reduces load. However error rates may go up.

In summary, the overall system availability depends on the availability of the individual components; the way they are connected (topology) and the distribution of the users/load over the system. With the resource controller 13 having knowledge of the system topology, the controller monitors the load distribution. The resource controller 13 then computes the system availability using the above information. The resource controller 13 can then control the system components to control the availability of resources and to provide the availability specified by the operator via the operator interface 30.

From the foregoing description it would be appreciated that the present invention provides a method for controlling the availability of reliable communication services to communication devices operating in a communication system. It would be further appreciated that the present invention provides a reliable communication service to communication devices at a reasonable cost, allowing an operator to vary the availability of a communication system after it has been purchased and configured, and without having to interrupt the system operation.

The invention has been described in detail with respect to preferred embodiments, and it will now be apparent from the foregoing to those skilled in the art that changes and modifications can be made without departing from the invention in its broader aspects, and the invention, therefore, as defined in the claims is intended to cover all such changes, modifications, or equivalencies as fall within the true spirit of the invention.

What is claimed is:

1. A communication system that provides communication services to a plurality of communication devices over one or more radio frequency (RF) channels, comprising:
   an operator interface configured to interactively specify a minimum probability of communication service availability to the plurality of the communication devices, the minimum probability being in the form of a percent availability figure; and
   a resource controller configured to receive the minimum probability from the operator interface, change a bit rate used to communicate data with at least one of the plurality of communication devices based on the minimum probability, and adjust the communication service availability to the plurality of communication devices according to the changed bit rate while continuing to provide the communication services to all of the plurality of communication devices.

2. The communication system of claim 1, wherein the bit rate used to communicate data with the at least one of the plurality of communication devices is changed by modifying a coding algorithm used to communicate information with the at least one of the plurality of communication devices.

3. The communication system of claim 1, wherein the resource controller monitors one or more system parameters to interactively modify communication service availability to the plurality of the communication devices.

4. The communication system of claim 3, wherein a system parameter essentially consists of at least one of a number of registered subscribers, load on a RF channel, load on a communication resource, a traffic mix, or a coding algorithm.

5. The communication system of claim 3, wherein the resource controller monitors load on one or more communication resources over a defined period of time to determine how to control the at least one communication resource.

6. The communication system of claim 3, wherein the resource controller monitoring the time that communication resource is out of service for deriving load distributions, to control the at least one communication resource.

7. The communication system of claim 1, wherein the operator interface is capable of adjusting a system parameter corresponding to a maximum number of registered subscribers to modifying the minimum probability of communication service availability to the plurality of communication devices.

8. The communication system of claim 1, wherein the minimum probability of communication service availability is specified as a number of nines.

9. A method for providing communication service to a plurality of communication devices over one or more radio frequency (RF) channels, comprising:
   monitoring at least one system parameter to interactively modify communication service availability to the plurality communication devices;
   specifying a minimum probability of communication service availability to the plurality of communication devices, the minimum probability being in the form of a percent availability figure;
   changing a bit rate used to communicate with at least one of the plurality of communication devices based on the specified minimum probability; and
   adjusting availability to the plurality of communication devices according to the changed bit rate while continuing to provide the communication services to all of the plurality of communication devices.

10. The method of claim 9, wherein
   the bit rate used to communicate data with the at least one of the plurality of communication devices is changed by modifying a coding algorithm used to provide voice services to the at least one of the plurality of communication devices.

11. The method of claim 9, wherein the at least one system parameter includes at least one of a number of registered subscribers, load on a RF channel, load on a communication resource, a traffic mix, or a coding algorithm.

12. The method of claim 11, wherein the load on one or more communication resources is monitored over a defined period of time.

13. The method of claim 12, wherein load distributions for each communication resource is derived based on a monitored load on a corresponding communication resource.

14. The method of claim 13, wherein time that a communication resource is out of service is monitored for deriving loud distributions.

15. The method of claim 9, further comprising adjusting a system parameter corresponding to a maximum number of registered subscribers to modify the minimum probability of communication service availability to the plurality of communication devices.

16. The method of claim 9, wherein the minimum probability of communication service availability is specified as a number of nines.

* * * * *

UNITED STATES PATENT AND TRADEMARK OFFICE
CERTIFICATE OF CORRECTION

PATENT NO. : 6,901,259 B2
DATED : May 31, 2005
INVENTOR(S) : Dorenbosch, Jheroen P.

It is certified that error appears in the above-identified patent and that said Letters Patent is hereby corrected as shown below:

Column 10,
Line 19, delete "monitoring" and replace with -- monitors --.
Line 31, delete "service" and replace with -- services --.
Line 36, insert -- of -- after "plurality".

Signed and Sealed this

Sixth Day of September, 2005

JON W. DUDAS
*Director of the United States Patent and Trademark Office*